(12) United States Patent
Liao et al.

(10) Patent No.: US 8,144,053 B2
(45) Date of Patent: Mar. 27, 2012

(54) SYSTEM AND METHOD FOR VERIFYING CONSISTENT MEASUREMENTS IN PERFORMING GPS POSITIONING

(75) Inventors: Xiangqian (Daniel) Liao, Irvine, CA (US); Mangesh Chansarkar, Irvine, CA (US)

(73) Assignee: CSR Technology Inc., San Jose, CA (US)

( * ) Notice: Subject to any disclaimer, the term of this patent is extended or adjusted under 35 U.S.C. 154(b) by 687 days.

(21) Appl. No.: 12/025,277

(22) Filed: Feb. 4, 2008

(65) Prior Publication Data

US 2009/0195446 A1 Aug. 6, 2009

(51) Int. Cl.
*G01S 19/42* (2010.01)
(52) U.S. Cl. .................................. 342/357.25
(58) Field of Classification Search . 342/357.01–357.17, 357.67, 357.2–357.78
See application file for complete search history.

(56) References Cited

U.S. PATENT DOCUMENTS

| | | |
|---|---|---|
| 4,445,118 A | 4/1984 | Taylor et al. |
| 5,416,712 A | 5/1995 | Geier et al. |
| 5,663,734 A | 9/1997 | Krasner |
| 5,663,735 A | 9/1997 | Eshenbach |
| 5,781,156 A | 7/1998 | Krasner |
| 5,812,087 A | 9/1998 | Krasner |
| 5,825,327 A | 10/1998 | Krasner |
| 5,831,574 A | 11/1998 | Krasner |
| 5,841,396 A | 11/1998 | Krasner |
| 5,874,914 A | 2/1999 | Krasner |
| 5,884,214 A | 3/1999 | Krasner |
| 5,944,770 A | 8/1999 | Enge et al. |
| 5,945,944 A | 8/1999 | Krasner |
| 5,999,124 A | 12/1999 | Sheynblat |
| 6,002,363 A | 12/1999 | Krasner |
| 6,016,119 A | 1/2000 | Krasner |
| 6,052,081 A | 4/2000 | Krasner |
| 6,057,800 A | 5/2000 | Yang et al. |
| 6,061,018 A | 5/2000 | Sheynblat |
| 6,064,336 A | 5/2000 | Krasner |
| 6,104,338 A | 8/2000 | Krasner |
| 6,104,340 A | 8/2000 | Krasner |
| 6,107,960 A | 8/2000 | Krasner |
| 6,111,540 A | 8/2000 | Krasner |
| 6,131,067 A | 10/2000 | Girerd |
| 6,133,871 A | 10/2000 | Krasner |

(Continued)

FOREIGN PATENT DOCUMENTS

EP 1 186 905 3/2002

(Continued)

OTHER PUBLICATIONS

Marketing Material: Qualcomm CDMA Technologies—Integrated Solutions—MGP6200™ Multimode GPS Processor (8 pages).

(Continued)

*Primary Examiner* — Thomas Tarcza
*Assistant Examiner* — Nga X Nguyen
(74) *Attorney, Agent, or Firm* — Pillsbury Winthrop Shaw Pittman LLP

(57) ABSTRACT

Systems and methods are provided for verifying whether a set of satellite signals may be used to calculate an estimated position. Example systems and methods may include a GPS receiver for receiving the satellite signals and a measurement consistency verifier to analyze a geometric configuration of the satellites from which the satellite signals were acquired. The measurement consistency verifier may determine if the satellites are sufficiently close to one another to provide consistent measurements.

20 Claims, 6 Drawing Sheets

U.S. PATENT DOCUMENTS

| | | | |
|---|---|---|---|
| 6,133,873 | A | 10/2000 | Krasner |
| 6,133,874 | A | 10/2000 | Krasner |
| 6,150,980 | A | 11/2000 | Krasner |
| 6,185,427 | B1 | 2/2001 | Krasner |
| 6,208,290 | B1 | 3/2001 | Krasner |
| 6,208,291 | B1 | 3/2001 | Krasner |
| 6,215,441 | B1 | 4/2001 | Moeglein |
| 6,215,442 | B1 | 4/2001 | Sheynblat |
| 6,236,354 | B1 | 5/2001 | Krasner |
| 6,239,742 | B1 | 5/2001 | Krasner |
| 6,259,399 | B1 | 7/2001 | Krasner |
| 6,272,430 | B1 | 8/2001 | Krasner |
| 6,278,404 | B1 | 8/2001 | Niles |
| 6,289,041 | B1 | 9/2001 | Krasner |
| 6,307,504 | B1 | 10/2001 | Sheynblat |
| 6,313,786 | B1 | 11/2001 | Sheynblat |
| 6,314,308 | B1 | 11/2001 | Sheynblat |
| 6,377,209 | B1 | 4/2002 | Krasner |
| 6,408,196 | B2 | 6/2002 | Sheynblat |
| 6,411,254 | B1 | 6/2002 | Moeglein |
| 6,411,892 | B1 | 6/2002 | Van Diggelen |
| 6,417,801 | B1 | 7/2002 | Van Diggelen |
| 6,421,002 | B2 | 7/2002 | Krasner |
| 6,429,814 | B1 | 8/2002 | van Diggelen et al. |
| 6,433,731 | B1 | 8/2002 | Sheynblat |
| 6,453,237 | B1 | 9/2002 | Fuchs et al. |
| 6,459,406 | B1 * | 10/2002 | Tseng et al. ............. 342/357.11 |
| 6,484,097 | B2 | 11/2002 | Fuchs et al. |
| 6,487,499 | B1 | 11/2002 | Fuchs et al. |
| 6,510,387 | B2 | 1/2003 | Fuchs et al. |
| 6,542,821 | B2 | 4/2003 | Krasner |
| 6,583,757 | B2 | 6/2003 | Krasner |
| 6,597,311 | B2 | 7/2003 | Sheynblat |
| 6,683,564 | B1 | 1/2004 | McBurney |
| 7,019,689 | B1 | 3/2006 | McBurney et al. |
| 7,064,709 | B1 | 6/2006 | Weisenburger et al. |
| 7,411,546 | B2 | 8/2008 | Pitt et al. |
| 2005/0046614 | A1 * | 3/2005 | Akano ..................... 342/357.02 |
| 2005/0253755 | A1 * | 11/2005 | Gobara .................... 342/357.15 |
| 2005/0259003 | A1 * | 11/2005 | Wakamatsu ............. 342/357.08 |
| 2006/0077096 | A1 | 4/2006 | King et al. |
| 2008/0018529 | A1 * | 1/2008 | Yoshioka ................. 342/357.01 |
| 2008/0020783 | A1 | 1/2008 | Pitt et al. |
| 2009/0002234 | A1 * | 1/2009 | Normark et al. ......... 342/357.15 |
| 2009/0128406 | A1 * | 5/2009 | Alanen et al. ............ 342/357.12 |

FOREIGN PATENT DOCUMENTS

| | | |
|---|---|---|
| EP | 1 186 905 A2 | 3/2002 |
| WO | WO01/071375 | 9/2001 |
| WO | WO 01/71375 A2 | 9/2001 |

OTHER PUBLICATIONS

Marketing Material: uNav Microelectronics—uN9x18 Low Power, High Performance GPS Receiver Chipset/uN9x18 GPS Receiver Solution (9 pages).

Marketing Material: uNav Microelectronics, uN9x18 Low Power, High Performance GPS Receiver Chipset (2 pages).

Marketing Material: Global Locate—Hammerhead II™, Single Chip AGPS Solution (2 pages).

Marketing Material/Press Release: Broadcom Introduces Advanced Single-Chip GPS Solution for Mobile Applications (3 pages).

Marketing Material/White Paper: SnapTrack: A Qualcomm Company—SnapTrack's Wireless Assisted GPS™ (A-GPS) Solution Provides the Industry's Best Location System—Location Technologies for GSM, GPRS and WCDMA Networks (Qualcomm CDMA Technologies: Enabling the Future of Communications) (4 pages).

* cited by examiner

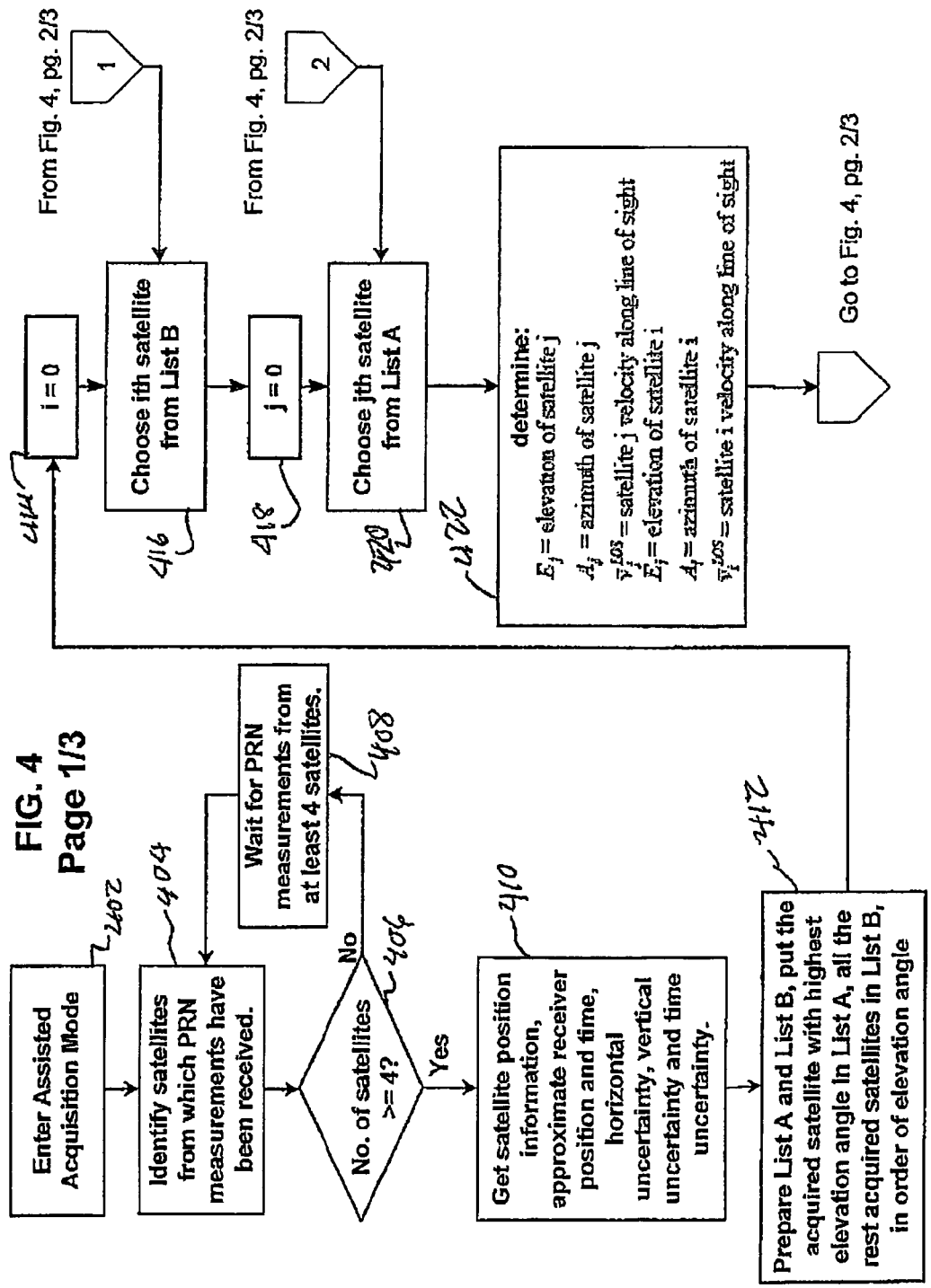

Page 2/3

Page 3/3

SYSTEM AND METHOD FOR VERIFYING CONSISTENT MEASUREMENTS IN PERFORMING GPS POSITIONING

BACKGROUND OF THE INVENTION

1. Field of the Invention

This invention relates generally to positioning systems, and more particularly, to systems and methods for verifying consistent measurements in un-synchronized GPS positioning.

2. Related Art

The Global Positioning System (GPS) is an example of a Satellite Positioning System (SATPS), which is maintained by the U.S. Government. GPS is satellite-based using a network of at least 24 satellites orbiting 11,000 nautical miles above the Earth, in six evenly distributed orbits. Each GPS satellite orbits the Earth every twelve hours.

One function of the GPS satellites is to serve as a clock. Each GPS satellite derives its signals from an on board 10.23 MHz Cesium atomic clock. Each GPS satellite transmits a spread spectrum signal with its own individual pseudo noise (PN) code. By transmitting several signals over the same spectrum using distinctly different PN coding sequences the GPS satellites share the same bandwidth without interfering with each other. The code is 1023 bits long and is sent at a rate of 1.023 megabits per second, yielding a time mark, sometimes called a "chip" approximately once every micro-second. The sequence repeats once every millisecond and is called the coarse acquisition code (C/A code.) Every $20^{th}$ cycle the code can change phase and is used to encode a 1500 bit long message, which contains "almanac" data for the other GPS satellites.

There are 32 PN codes designated by the GPS authority. Twenty-four of the PN codes belong to current GPS satellites in orbit and the $25^{th}$ PN code is designated as not being assigned to any GPS satellite. The remaining PN codes are spare codes that may be used in new GPS satellites to replace old or failing units. A GPS receiver, using the different PN sequences, searches the signal spectrum looking for a match. If the GPS receiver finds a match, then it has identified the GPS satellite, which generated that signal.

Ground based GPS receivers use a variant of radio range measurement methodology, called tri-lateration, to determine the position of the ground based GPS receiver. The tri-lateration method depends on the GPS receiving unit obtaining a time signal from the GPS satellites. By knowing the actual time and comparing it to the time that is received from the GPS satellites that receiver can calculate the distance to the GPS satellite. If, for example, the GPS satellite is 12,000 miles from the receiver, then the receiver must be located somewhere on the location sphere defined by a radius of 12,000 miles from that GPS satellite. If the GPS receiver then ascertains the position of a second GPS satellite it can calculate the receiver's location based on a location sphere around the second GPS satellite. The two spheres intersect and form a circle with the GPS receiver being located somewhere within that location circle. By ascertaining the distance to a third GPS satellite the GPS receiver can project a location sphere around the third GPS satellite. The third GPS satellite's location sphere will then intersect the location circle produced by the intersection of the location spheres of the first two GPS satellites at just two points. By determining the location sphere of one more GPS satellite whose location sphere will intersect one of the two possible location points, the precise position of the GPS receiver is determined to be the location point located on the Earth. The fourth GPS satellite is also used to resolve the clock error in the receiver. As a consequence, the exact time can also be determined, because there is only one common time offset that accounts for the position calculations of all the GPS satellites. The tri-lateration method may yield positional accuracy on the order of 30 meters; however the accuracy of GPS position determination may be degraded due to signal strength and multi-path reflections.

As many as 11 GPS satellites may be received by a GPS receiver at one time. In certain environments such as a canyon, some GPS satellites may be blocked out, and the GPS position determining system may depend for position information on GPS satellites that have weaker signal strengths, such as GPS satellites near the horizon. In other cases overhead foliage may reduce the signal strength that is received by the GPS receiver unit.

Recently mobile communication devices such as cellular telephones, or mobile handsets, have been incorporating GPS receiver technology using multiple dedicated semiconductor chips to implement a communication portion and other dedicated semiconductor chips to implement a GPS sub-system of the mobile communication device. Such mobile handsets operate in connection with a mobile communications network for telecommunications services, and in connection with the GPS system to obtain the position of the mobile handset. In mobile handsets with integrated GPS receivers, time information obtained from the mobile communications network may be provided to the GPS receiver in order to reduce the search space for detecting satellites. Systems that make time information from a mobile communications network available to the GPS receiver are known generally as assisted GPS systems (A-GPS). In A-GPS systems, coarse or precise user position and time information can be readily provided from the network to help reduce TTFF (time to first fix)—an important GPS performance parameter.

In situations of autonomous operation or precise aiding, where GPS time is either decoded, or position and time are precisely assisted, all the generated measurements are frame-synchronized without millisecond ambiguity in transmit time. Thus, synchronized positioning is applied. However, it may require a substantial amount of time to obtain frame synchronization when the signal strength is low or when the dynamics is high. The frame synchronization may even fail for various reasons. Some applications (e.g. E911) may not be able to wait such a long time for the acquired satellites to be frame synchronized.

The problem can be solved when the receiver operates in assisted mode in A-GPS system, which provides measurements and computes positioning even before frame or bit synchronization. The methodology is called un-synchronized positioning, which works under the condition that all the un-synchronized measurements can be made consistent without millisecond ambiguity between satellites based on the priori user position and time information.

The receiver typically checks the ranging difference uncertainty between the satellites, based on the priori position and time uncertainty of the receiver, to determine if the adjusted measurements can be made consistent or not in order to apply un-synchronized positioning. The consistency condition is only met when the user position and time uncertainty is under a certain limit, for example a safe limit of 75 km for position uncertainty in some applications assuming time uncertainty has far less effect on the ranging difference.

However, when the limit is exceeded, the measurements may not be made consistent and the resulting positioning information can be totally wrong. When this happens, the GPS receiver may have to obtain frame synchronization for a minimum number of four satellites before the valid positioning can be provided, which in return slows down the acquisition of the rest visible satellites especially when the signal strength is weak. This is not tolerable in applications in urgent needs of positioning such as E911. Therefore, criterion is needed to check if the measurements can be made consistent or not when the uncertainty combination of user position and time is greater than 75 km.

In view of the above, there is a need for methods and systems that allow GPS receivers to tolerate larger position and time uncertainties and improved time-to-first-fix (TTFF).

SUMMARY

In view of the above, systems and methods are provided to verify whether measurements from a minimum set of satellite signals may be used to determine an estimated position. In one example of a method consistent with the present invention, a geometric configuration formed by an approximate user position and GPS satellites' position is analyzed in terms of azimuth and elevation. Based on the geometric configuration, determining if the satellites are sufficiently close to one another to yield consistent measurements.

In another aspect of the invention, an example system is provided for verifying whether a set of satellite signals may be used to calculate an estimated position. The example system includes a GPS receiver for receiving the satellite signals and a measurement consistency verifier to analyze a geometric configuration of the satellites from which the satellite signals were acquired. The measurement consistency verifier may determine if the satellites are sufficiently close to one another to provide consistent measurements.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

In the following description, reference is made to the accompanying drawings that form a part hereof, and in which is shown by way of illustration one or more specific implementations in which the invention may be practiced. It is to be understood that other implementations may be utilized and structural changes may be made without departing from the scope of this invention.

Figure 1:
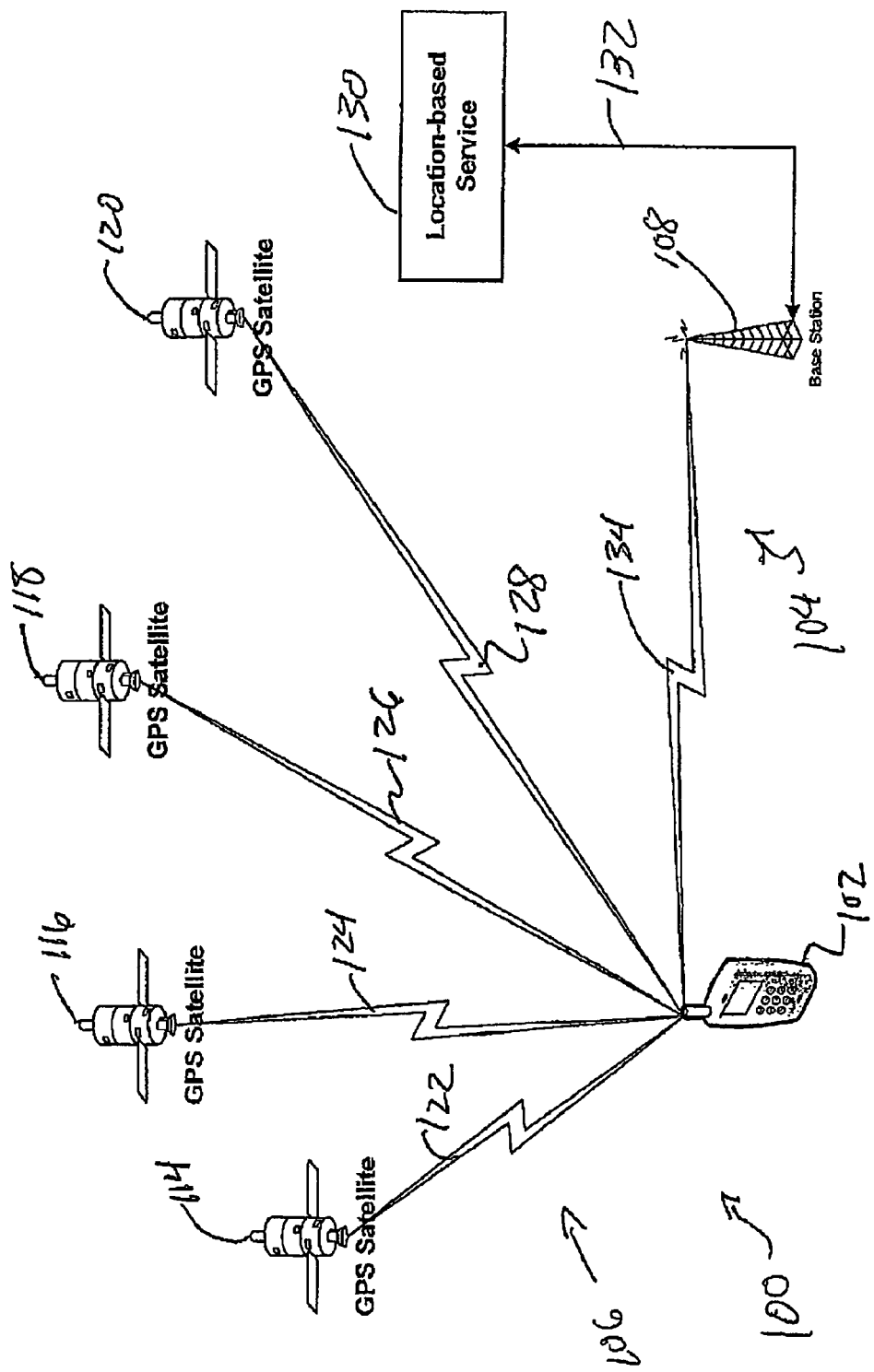
FIG. 1 is a schematic diagram illustrating operation of an example of a system for providing consistent measurement verification in a GPS positioning system.

FIG. 1 is a block diagram of an example system 100 for providing time aiding information to a GPS receiver in a mobile handset 102. The system 100 includes a mobile communications network 104 and a GPS system 106. The system 100 also includes a location-based service 130, such as E911, that may be provided to the mobile handset 102 via the mobile telecommunications network 104. The mobile communications network 104 provides telecommunications services to the mobile handset 102 and to other subscribers via a base station transceiver 108. The GPS system 106 includes a plurality of GPS satellites 114, 116, 118, 120, which provide positioning data to the GPS receiver in the mobile handset 102 over corresponding GPS data links 122, 124, 126, 128.

The GPS data links 122, 124, 126, 128 between the GPS receiver in the mobile handset 102 and the GPS satellites 114, 116, 118, 120 include spread-spectrum radio signals encoded with a code called L1 band C/A (Coarse/Acquisition). The C/A code is a code of a PN (pseudo-random) noise sequence having a transmission signal rate (or chip rate) of 1.023 MHz and a code length of 1023 (i.e., 1 period=1 millisecond). The data bits are 20 milliseconds long and are synchronized to the code. One of the 1 ms periods in each 20 ms period is selected by the satellite as the beginning of the data period. The data bits and the PN code are summed, modulo 2, and then modulated onto a carrier using Binary Phase Shift Keying (BPSK). The nominal carrier frequency is 1575.42 MHz. The signals transmitted by the GPS satellites 114, 116, 118, 120 over the GPS data links 122, 124, 126, 128 are encoded to include orbit data relating to the GPS satellites 114, 116, 118, 120 containing, for example, the satellite's orbit, time information, and delay time. The GPS receiver in the mobile handset 102 uses the orbit data to determine pseudo-range measurements indicating a distance between a given GPS satellite 114, 116, 118, 120 and the mobile handset 102. Using triangulation techniques as known in the art, the GPS receiver in the mobile handset 102 may determine its position from the distances between at least three satellites and the mobile handset 102.

The mobile telecommunications network 104 may provide aiding information to the GPS receiver in the mobile handset 102 to enable the GPS receiver to determine its position while attempting to acquire GPS signals from the GPS satellites 114, 116, 118, 120. In the aiding information, the mobile telecommunications network 104 may provide the GPS receiver with updated GPS time, satellite information, approximate mobile handset 102 position information, and statistical information about the user state, such as position and timing uncertainty measures.

The mobile communications network 104 may be any telecommunications network that provides any type of wireless service. A cellular telecommunications network is one example of such a network. More specific examples of such networks include mobile telecommunications networks based on GSM, CDMA, TDMA, and other signaling protocols. The mobile communications network 104 communicates with the mobile handset 102, which may or may not be a subscriber of the mobile communications network 104, using the network's signaling protocol over a mobile network communication link 134.

The GPS receiver in the mobile handset 102 may operate in one of several modes that depend on the system architecture and requirements. For example, the GPS receiver in the mobile handset 102 may operate in autonomous mode in which the GPS receiver does not obtain external aiding. The GPS signals are received, decoded and synchronized so that there is no time ambiguity. Synchronized positioning is applied in this mode.

The GPS receiver in the mobile handset 102 may also operate in an assisted mode. When the mobile handset is powering up, or after signal outage for some time, the GPS receiver in the mobile handset 102 starts with aiding information and attempts to acquiring GPS signals 122, 124, 126, 128. Once the signals are acquired, the GPS receiver generates the un-synchronized pseudorange measurements and check if they can be made consistent or not by millisecond adjustment. If the consistency conditions are met, the adjusted measurements are fed into the positioning estimator for position computation.

Figure 2:
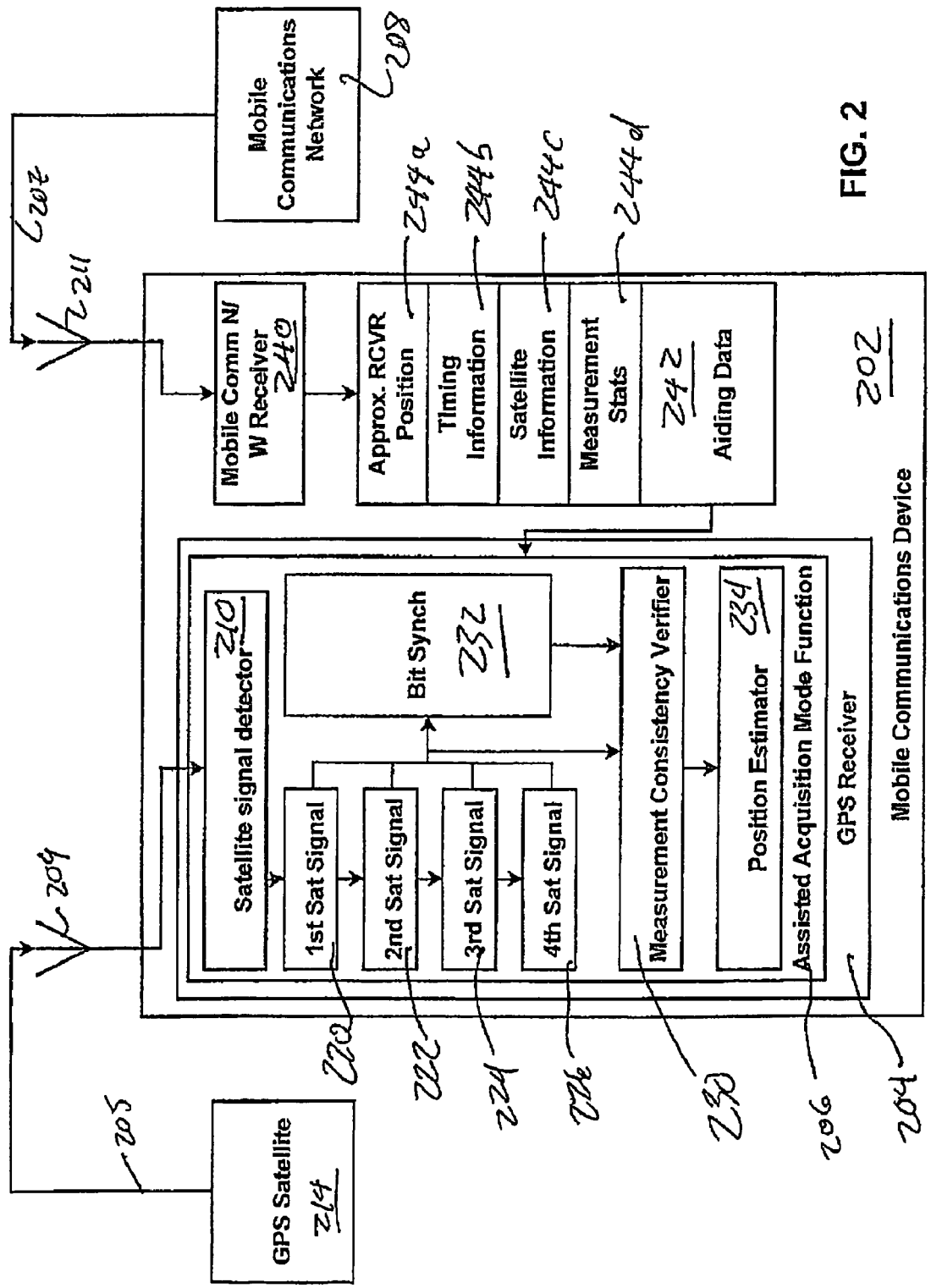
FIG. 2 is a block diagram of a mobile handset having a GPS receiver that performs consistent measurement verification during satellite signal acquisition.

FIG. 2 is a block diagram of a mobile handset 202 having a GPS receiver that performs consistent measurement verification during satellite signal acquisition. The mobile handset 202 includes a GPS receiver 204 connected to a GPS signal antenna 209 to receive GPS signals from a GPS satellite 214 over a GPS connection 205. The mobile handset 202 also includes a mobile communication network receiver 240 connected to a communications network antenna 211 to receive communications network signals from a mobile communications network 208 over a mobile communications network connection 207. The mobile handset 202 may include hardware and/or software that permit the user of the mobile handset 202 to be a subscriber of services provided by the mobile communications network 208.

The mobile handset 202 in FIG. 2 includes an assisted acquisition mode function 206, which operates when aiding data is available and provides fast un-synchronized positioning at even sub-second TTFF. In this mode, the GPS receiver 204 is performed with the assistance of aiding data 242 received from an aiding source such as the mobile communications network 208. The aiding data 242 assists the GPS receiver 204 to calculate an estimated location without frame or even bit synchronization. In the example implementation, the mobile handset 202 communicates with the mobile communications network 208 to receive the aiding data 242. The aiding data 242 may include an approximate receiver position 244a, timing information 244b, satellite information 244c (e.g. ephemeris and/or almanac data), and measurement statistics 244d.

In the assisted acquisition mode function 206, a satellite signal detector 210 receives GPS signals from the GPS signal antenna 209 and identifies whether it has received signals from specific GPS satellites. The GPS receiver 204 may identify a first satellite signal 220, a second satellite signal 222, a third satellite signal 224 and a fourth satellite signal 226. As the GPS receiver 204 identifies each satellite signal, a position estimator 234 in the assisted acquisition mode function 206 attempts to calculate an estimated position (a fifth satellite signal is needed if altitude is unknown). Before estimating a position, the satellite signals 220, 222, 224 and 226 are tested for consistency in the measurement consistency verifier 230. A bit synchronization function 232 does bit synchronization for each signal. The bit synchronization function 232 operates concurrently with the consistency verifier 230.

In example implementations, measurement consistency can be verified even when the uncertainty is greater than the predetermined maximum of 75 km by considering the geometric configuration formed by the satellites and the mobile handset 202. In general, the closer the satellites in azimuth and elevation, the smaller the ranging differences resulting from position uncertainty. Similarly, the smaller the velocity difference on line-of-sight, the smaller the ranging differences resulting from time uncertainty. The measurement consistency verifier 230 analyzes this geometric configuration formed by the satellites and the mobile handset 202 to determine if the ranging difference uncertainty is sufficiently small such that consistent measurements can be achieved between the satellites.

The measurement consistency verifier 230 operates by retrieving parameters obtained from the aiding source, which in this example is the mobile communications network 208. The geometric configuration of the satellites and the mobile handset 202 is analyzed by sequentially selecting two satellites among all of the acquired satellites that have communicated GPS signals to the mobile handset 202.

Figure 3:
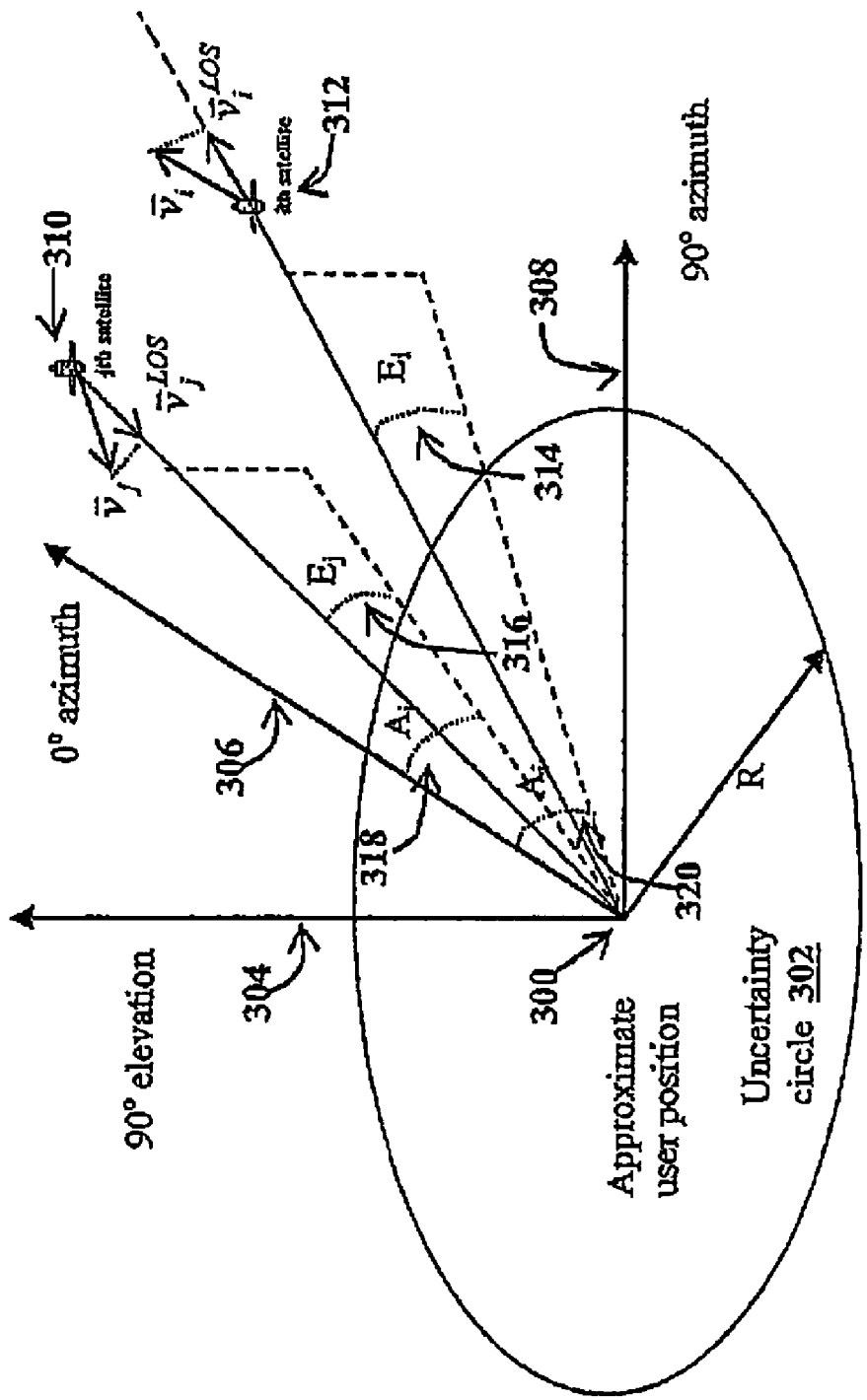
FIG. 3 is a schematic diagram showing geometric configuration of mobile handset user and satellites of the system illustrated in FIG. 1.

FIG. 3 is a schematic diagram showing the geometric configuration of mobile handset user and satellites of the system illustrated in FIG. 1. The geometric configuration is illustrated in FIG. 3 with reference to an approximate user position 300, a position uncertainty circle 302, and an elevation 304. The position uncertainty circle 302 lies in a horizontal plane parallel to the earth's surface with the approximate user position 300 at its center. The position uncertainty circle 302 is normal to a 90° elevation 304 angle. The elevation of the satellites are measured by an angle between the 90° elevation 304 angle and a 0° elevation angle on the position uncertainty circle 302. The azimuth of the satellites is measured from a 0° azimuth angle 306 around the position uncertainty circle 302 with the approximate user position 300 as the vertex of the azimuth angle; such as for example, a 90° azimuth angle 308. The radius R is the horizontal position uncertainty. The mobile handset receives GPS signals from a first satellite 310 and a second satellite 312.

In example implementations, measurement consistency is verified by analyzing the geometric configuration formed by the approximate user position 300 and the positions of the satellites 310, 312. The positions of the satellites 310, 312 can be defined by elevation and azimuth. As shown in FIG. 3, the first satellite 310 has an elevation angle $E_j$ at 316 and an azimuth angle $A_j$ at 318. The second satellite 312 has an elevation angle $E_i$ at 314 and an azimuth angle $A_i$ at 320.

FIG. 3 also shows a first velocity vector $\vec{v}_j$ for the first satellite 310 and a second velocity vector $\vec{v}_i$ for the second satellite 312. The first and second satellite vectors, $\vec{v}_j$ and $\vec{v}_i$ are used to determine a first line-of-sight satellite velocity $\vec{v}_j^{LOS}$ and a second line-of-sight velocity $\vec{v}_i^{LOS}$.

In an example implementation, analysis of the geometric configuration shown in FIG. 3 may begin by selecting a first satellite with highest elevation and the second satellite closest to the first satellite, for example, with the second highest elevation. In FIG. 3, the first satellite 310 is satellite j. The second satellite 312 is satellite i, the closest satellite to the first one. For the two selected satellites i and j, the geometric configuration parameters described above can be used in the following inequality:

$$2 \cdot R \cdot \sqrt{\cos^2 E_i + \cos^2 E_j - 2 \cdot \cos E_i \cos E_j \cos(A_i - A_j)} + \\ 2 \cdot \Delta T \cdot |\vec{v}_j^{LOS} - \vec{v}_i^{LOS}| + 2 \cdot \Delta H \cdot |\sin E_i - \sin E_j| < \lambda \cdot 1 \text{ ms} \quad \text{Inequality (1)}$$

Where:
R is user position horizontal uncertainty.
$\Delta H$ is user position vertical uncertainty.
$\Delta T$ is user time uncertainty.
$E_i$, $E_j$, $A_i$ and $A_j$ are the elevation and azimuth for a pair of satellites that are used to verify measurement consistency.

$\vec{v}_j^{LOS}$ and $\vec{v}_i^{LOS}$ are satellite velocities along the line-of-sight.

λ: wavelength (1 or 20).

The geometric configuration parameters used in the inequality above may be calculated. The geometric configuration parameters may be calculated using aiding data, or the parameters may be included in the aiding data. For example, referring back to FIG. 2, the horizontal uncertainty (R), the vertical uncertainty (ΔH), and the time uncertainty (ΔT) may be retrieved from measurement statistics 244d in the aiding data 242. The horizontal uncertainty (R) and the vertical uncertainty (ΔH) may be determined by the mobile communications network 104 (in FIG. 1). In some mobile communications networks 104, the approximate position of the mobile handset may be defined as the cell identifier for the cell in which the mobile handset is operating. The horizontal uncertainty (R) may be defined as a radius of a circle approximating the area of the cell.

The elevations ($E_i$, $E_j$), azimuth ($A_i$, $A_j$), and the satellite velocities ($\vec{v}_j^{LOS}$, $\vec{v}_i^{LOS}$) may be calculated using the approximate mobile handset position 244a, the approximate time 244b and satellite ephemeris or almanac data 244c in the aiding data 242. The wavelength (λ) is set to either 1 or 20. If the satellite signal from either satellite is not bit-synchronized, the wavelength is set to 1. If both satellite signals are bit-synchronized, the wavelength is set to 20. Those of ordinary skill in the art will appreciate that there are many ways to determine or obtain the parameters in Inequality (1) and that several ways are mentioned here as examples without limitation.

The assisted acquisition mode function 206 includes a bit synchronization function 232 to perform bit synchronization of the received satellite signals 220, 222, 224, 226. The satellite signals 220, 222, 224, 226 are encoded with the L1 band C/A code, which is a code of a PN noise sequence having a transmission signal rate of 1.023 MHz and a code length of 1023. The data bits are 20 milliseconds long and synchronized to the code. One of the 1 ms periods in each 20 ms period is selected by the satellite as the beginning of the data period. The bit synchronization function 232 determines which 1 ms period in the 20 ms period is the beginning of the data period.

If the measurement consistency verifier 230 determines that the satellite signals 220, 222, 224, 226 contain consistent measurements, the position estimator 234 then uses the satellite signals 220, 222, 224, 226 to calculate an estimated position of the mobile handset 202. If it is determined that the satellite signals 220, 222, 224, 226 do not contain consistent measurements, the positioning fails.

Figure 4:
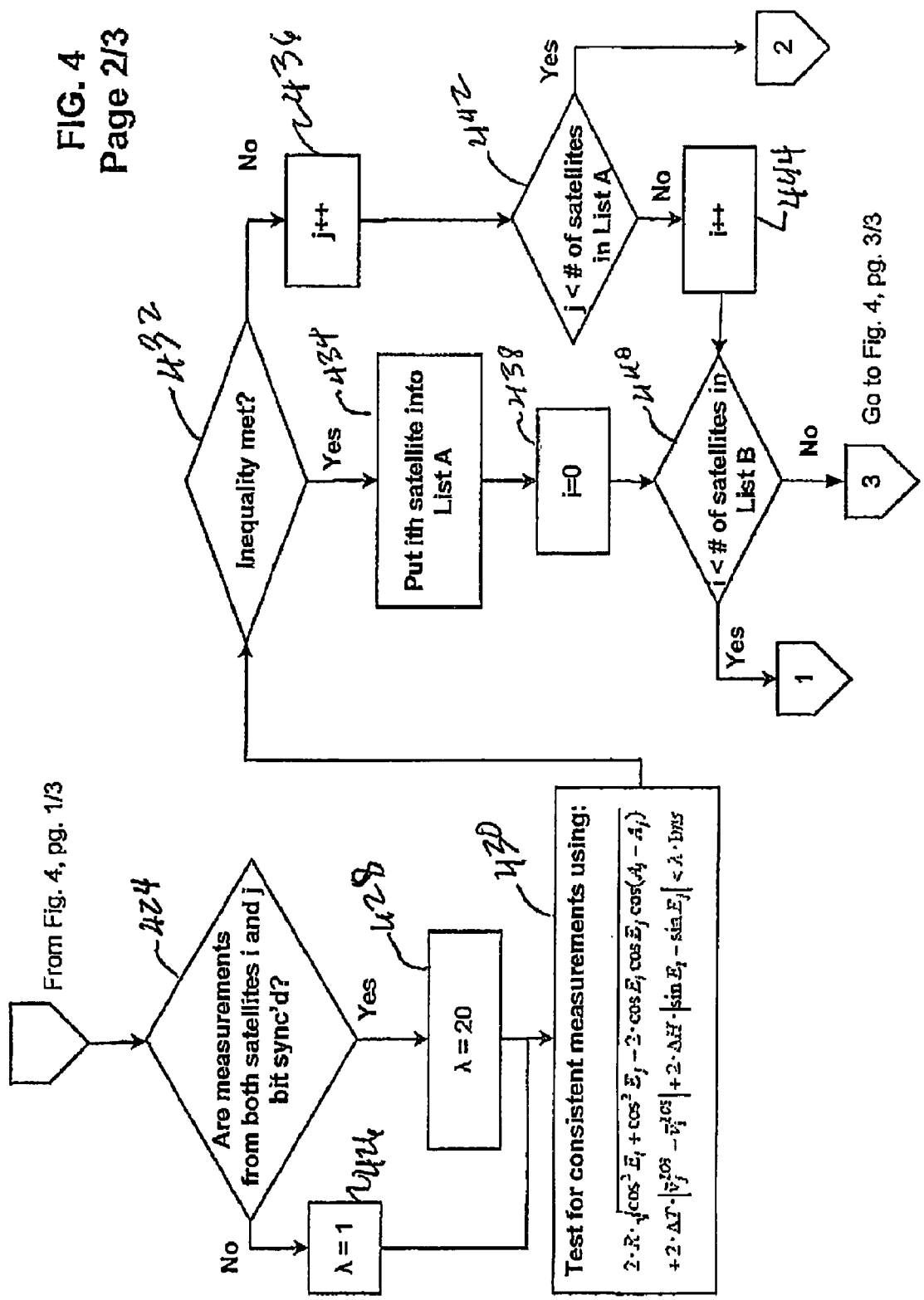
FIG. 4 is a flowchart illustrating operation of example methods for verifying consistent measurements in a GPS system.
Figure 4:
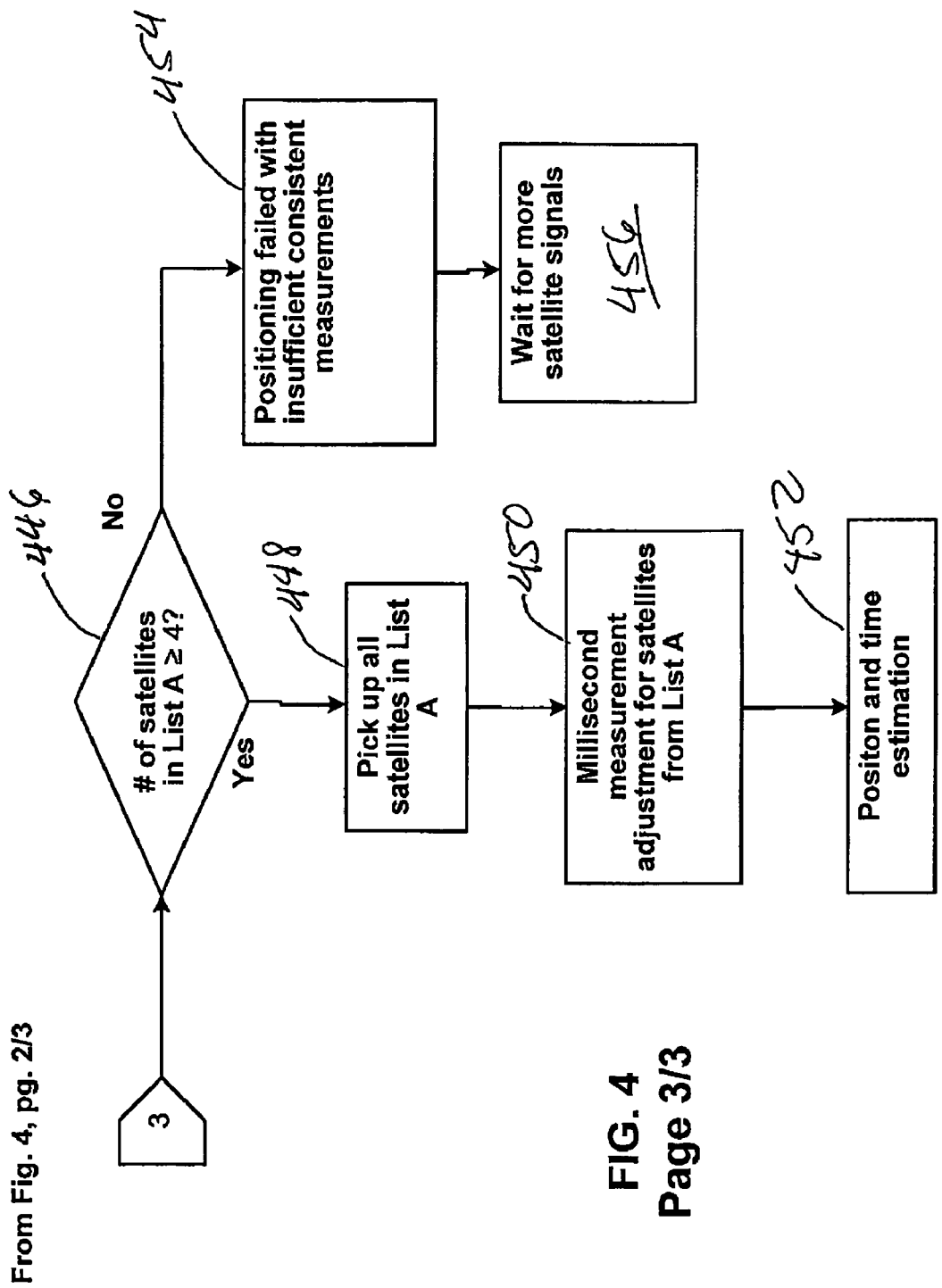

FIG. 4 is a flowchart illustrating operation of example methods for verifying consistent measurements in a GPS system. The method illustrated by the flowchart in FIG. 4 may be implemented in the mobile handset 202 described with reference to FIG. 2. The method may also be implemented in other devices having a GPS receiver or in a GPS server, or in devices such as base stations in mobile communications networks that perform assisted GPS functions in communication with a GPS receiver.

The example methods illustrated by the flowchart in FIG. 4 are typically performed when the GPS receiver is performing in assisted operation. The GPS receiver 204 (in FIG. 2) enters the assisted mode as shown at step 402. At step 404, the GPS receiver 204 identifies the satellites that have communicated PRN measurements to the GPS receiver 204. At decision block 406, the number of satellites from which GPS signals have been received is checked. If the number of satellites is less than four, the GPS receiver 204 continues to receive GPS signals and waits for GPS signals from at least four satellites at step 408. If the number of satellites from which PRN measurements have been received is at least four, the method proceeds to step 410. At step 410, the GPS receiver 204 obtains an approximate position, time and the associated uncertainties from aiding data retrieved from an aiding source for the mobile handset 202 that includes the GPS receiver 204.

Before using the GPS satellite signals to estimate a position, the GPS receiver 204 analyzes the geometric configuration of the satellites and the mobile handset 202 as indicated by the satellite position information and approximate receiver position information. The geometric configuration may indicate whether consistent measurements can be made with the GPS satellite signals received. Two satellite identity lists, List A and List B, are prepared at step 412. List A is for satellite identities having measurements that are consistent with each other. The other list, List B, is for satellite identities that are not consistent with the ones in the first list. At the start of consistency verification, all PRN identities of the acquired satellites are placed into the second list, List B or the inconsistent identity list. The satellite identity of a first satellite, which is the satellite closest to being directly overhead the mobile handset 202, or the satellite with the elevation angle closest to 90°, or the satellite with the highest elevation angle, is placed into the consistent identity list, which is List A. The satellite identities in List B are ordered according to the elevation angle; those satellites with the highest elevation angles being first on the list.

At step 414, an index i into List B is initialized to '0.' At step 416, a first satellite from List B is selected for testing and identified as satellite i. At the start of consistency verification, only one satellite is in List A—the satellite with the highest elevation angle. At step 418, an index j into List A is initialized to '0' and at step 420, a second satellite from List A is selected as a reference for the first satellite from List B to be tested against. Satellites are selected for reference from List A according to the value of j, and satellites are selected for testing from List B according to the value of index i. As satellites are determined to have measurements consistent with each other, the satellite identity from List B is added to List A and removed from List B. The values of i and j are adjusted as each pair of satellites is tested until all of the satellites in List B have been tested for consistency with the ones in List A.

The consistency test is performed by pairing satellites from List A and List B and performing a test using Inequality 1. At step 422, for satellite j, the following parameters are determined: the elevation angle $E_j$, the azimuth angle $A_j$, and the velocity along a line-of-sight $\vec{v}_j^{LOS}$. Also at step 422, for satellite i, the following parameters are determined: the elevation angle $E_i$, the azimuth angle $A_i$, and the satellite i velocity along the line-of-sight $\vec{v}_i^{LOS}$. At decision block 424, the GPS signals from each satellite i and j are checked to determine if both signals have been bit synchronized. If both signals have been bit synchronized, the wavelength, λ, is set to 20 at step 428. Otherwise, the wavelength, λ, is set to 1 at step 426.

At step 430, the parameters from steps 410, 422, and either 426 or 428 are used in Inequality (1), which is described above with reference to FIG. 3. At decision block 432, the results of the inequality are tested. If the inequality is met, satellite i is removed from the inconsistent identity list (List B) and put into the consistent identity list (List A) at step 434. At step 438, the index i is set to '0,' and at decision block 440, the index i is compared to the number of satellites in List B. If i is less than the number of satellites in List B, then there still remain in List B satellites to be verified with satellites in List A, and/or satellites that failed the consistency testing before the current one is tested. In either case, i is reset to 0 and the method continues to step 416 to verify consistency for the remaining satellites in List B against the satellites in List A, starting with the satellite with highest elevation angle.

If at decision block 440, index i is not less than the number of satellites in List B, then the consistency testing procedure is completed. The method then proceeds to step 446 for analysis of List A to determine if the satellites signals may be used to estimate a position. There are two cases in which the index i is not less than the number of satellites in List B at decision block 440. The first case is when the inequality was met in the previous test at step 432, then i is reset to 0 at step 438 but there are no more satellites left to test in List B. In the second case, at step 444, all satellites in List B have been tested against satellites in List A.

Decision block 440 may be performed when the previously tested satellite pair has been found to be inconsistent. The inequality is not met at step 432 and at step 436, index j is incremented to switch the index to the next satellite in List A. Index j is compared with the number of satellites in List A. If j is not less than the number of satellites in List A, meaning the ith satellite from List B has failed consistency check with all satellites in List A, i is incremented to test the next satellite in List B. Decision block 440 is also performed to re-test satellites in List B. Every time a new satellite identity from List B is added to the consistent identity list A, any satellite that has failed the consistency testing before this ith satellite is tested would be selected again for the consistency testing against the newly added satellite in the consistent identity list A. The consistency testing procedure in steps 414 to 444 iterates until all acquired satellites in List B are tested.

After the consistency testing procedure is completed, if at least four satellites are in the consistent identity list A, the measurements associated with these satellites are made consistent by millisecond adjustment before they are fed into the position estimator. At step 446, if the total number of satellites in the consistent identity list is less than four, there are not sufficient satellites with consistent measurements to obtain an estimated position and the positioning fails at step 454. The GPS receiver then waits for additional satellites to be acquired at 456. The same consistency testing procedure follows when more new satellites get acquired. If at least four satellites are in List A, the satellites in List A are selected for positioning calculation at step 448. At step 450, millisecond measurement adjustment is performed on the selected satellites so that all measurements are consistent. At step 452, position and time estimation is performed using the consistent measurements from the selected satellite signals.

It will be understood, and is appreciated by persons skilled in the art, that one or more functions, modules, units, blocks, processes, sub-processes, or process steps described above may be performed by hardware and/or software. If the process is performed by software, the software may reside in software memory (not shown) in any of the devices described above. The software in software memory may include an ordered listing of executable instructions for implementing logical functions (i.e., "logic" that may be implemented either in digital form such as digital circuitry or source code or in analog form such as analog circuitry or an analog source such an analog electrical, sound or video signal), and may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "computer-readable medium" and/or "signal-bearing medium" is any means that may contain, store, communicate, propagate, or transport the program for use by or in connection with the instruction execution system, apparatus, or device. The computer readable medium may selectively be, for example but not limited to, an electronic, magnetic, optical, electromagnetic, infrared, or semiconductor system, apparatus, device, or propagation medium. More specific examples, but nonetheless a non-exhaustive list, of computer-readable media would include the following: an electrical connection (electronic) having one or more wires, a portable computer diskette (magnetic), a RAM (electronic), a read-only memory "ROM" (electronic), an erasable programmable read-only memory (EPROM or Flash memory) (electronic), an optical fiber (optical), and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

What is claimed is:

1. A method for verifying whether a set of satellite signals from a plurality of GPS satellites is useful to determine a suitable estimated position of a GPS receiver associated with a user, the method comprising:

determining, by a processor included in the GPS receiver, a geometric configuration formed by an approximate position of the user and the GPS satellites' positions, the geometric configuration thereby defining a positional relationship between each of the user and the GPS satellites and being in terms of azimuth and elevation;

based on the geometric configuration, determining if the satellites are sufficiently close to one another to yield consistent measurements for which ranging difference uncertainties are smaller than a predetermined value.

2. The method of claim 1 where the step of determining if the satellites are sufficiently close to one another comprises:

selecting a pair of satellites to test for consistent measurements, one satellite being a reference satellite and the other being a satellite under test;

determining the following parameters:

R=user position horizontal uncertainty, $\Delta H$=user position vertical uncertainty, $\Delta T$=user time uncertainty, $E_i$, $E_j$,=elevation for the selected pair of satellites, $A_i$, $A_j$=azimuth for the selected pair of satellites, $\vec{V}_j^{LOS}$, $\vec{V}_i^{LOS}$=satellite velocities along the line-of-sight for the selected pair of satellites, and $\lambda$=wavelength=1 if any one of the satellite signals is not bit synchronized, or 20 if both of the satellite signals are bit synchronized;

using the parameters in the inequality below to determine if:

$$2 \bullet R \bullet \text{SQRT}[\cos^2 E_i + \cos^2 E_j - 2 \bullet \cos E_i \cos E_j \cos(A_i - A_j)] + 2 \bullet \Delta T \bullet |\vec{V}_j^{LOS} - \vec{V}_i^{LOS}| + 2 \bullet \Delta H \bullet |\sin E_i - \sin E_j| < \lambda \bullet 1 \text{ ms};$$

if the inequality is met, designating the satellite under test as a consistent satellite, the consistent satellites being the reference satellites as satellites are tested;

designating the satellite under test as an inconsistent satellite if the inequality between this satellite and all of the consistent satellites is not met;

determining whether a sufficient number of satellites are found to be consistent such that measurements from the consistent satellites can be used to estimate the position.

3. The method of claim 2 further comprising:

before beginning the consistency verification, creating a consistent identity list and an inconsistent identity list and moving the satellite having the highest elevation angle into the consistent identity list and all of the remaining satellites into the inconsistent identity list;

moving satellites from an inconsistent identity list into a consistent identity list when the satellites are verified to be consistent with any satellite in the consistent identity list.

4. The method of claim 3 where:

the step of selecting the pair of satellites comprises:
ordering the satellites in the inconsistent identity list in order of highest to lowest elevation angles.

5. The method of claim 3 further comprising:

leaving the inconsistent satellites in the inconsistent identity list as the satellites are verified to be inconsistent with all the satellites in the consistent identity list.

6. The method of claim 3 where the step of determining if a sufficient number of satellite signals are found to be consistent includes determining if the number of satellites in the consistent identity list is the sufficient number or greater for positioning.

7. The method of claim 2 where the step of determining the parameters includes:

retrieving aiding data from an aiding source; and
determining the parameters from the aiding data.

8. A system for verifying whether a set of satellite signals from a plurality of GPS satellites is useful to calculate an estimated position, the system comprising:

a GPS receiver associated with a user for receiving the satellite signals;

a measurement consistency verifier to analyze a geometric configuration that defines a positional relationship between each of the user and the GPS satellites from which the satellite signals were acquired and to determine if the GPS satellites are sufficiently close to one another to provide consistent measurements for which ranging difference uncertainties are smaller than a predetermined value.

9. The system of claim 8 where the measurement consistency verifier includes software to perform:

a selection of a pair of satellites from a set of satellite identities;

a determination of the following parameters:

R=user position horizontal uncertainty,
$\Delta H$=user position vertical uncertainty,
$\Delta T$=user time uncertainty,
$E_i$, $E_j$=elevation for the selected pair of satellites,
$A_i$, $A_j$=azimuth for the selected pair of satellites,
$\vec{V}_j^{LOS}$, $\vec{V}_i^{LOS}$=satellite velocities along the line-of-sight for the selected pair of satellites, and
$\lambda$=wavelength=1 if any one of the satellite signals is not bit synchronized, or 20 if both of the satellite signals are bit synchronized;

using the parameters a determination of whether:

$$2 \bullet R \bullet SQRT[\cos^2 E_i + \cos^2 E_j - 2 \bullet \cos E_i \cos E_j \cos (A_i - A_j)] + 2 \bullet \Delta T \bullet |\vec{V}_j^{LOS} - \vec{V}_i^{LOS}| + 2 \bullet \Delta H \bullet |\sin E_i - \sin E_j| < \lambda \bullet 1 \text{ ms};$$

a designation of the satellite under test as a consistent satellite if the inequality is met;

a designation of the satellite under test as an inconsistent satellite if the inequality between this satellite and all of the consistent satellites is not met;

a determination of whether a sufficient number of satellites are found to be consistent such that measurements from the consistent satellites can be used to estimate the position.

10. The system of claim 8 where a satellite selection function moves satellites from an inconsistent identity list into a consistent identity list as they are verified consistent with any satellite in the consistent identity list.

11. The system of claim 8 where a satellite selection function further orders the satellites in the inconsistent identity list in order of highest to lowest elevation angles.

12. The system of claim 8 where a satellite selection function keeps inconsistent satellites in a inconsistent identity list as they are verified not consistent with all the satellites in the consistent identity list.

13. The system of claim 8 where measurement consistency verifier determines if the number of satellites in the consistent identity list is the sufficient number or greater for positioning.

14. The system of claim 8 further comprising a connection to an aiding source over which the aiding source communicates aiding data, including parameters used in the inequality.

15. The system of claim 14 where the aiding source includes a mobile communications network.

16. The system of claim 15 where the GPS receiver resides on a mobile handset operable to communicate with the mobile communications network.

17. A mobile communications device for communicating over a mobile communications network, the mobile handset comprising:

a mobile communications transceiver for transmitting and receiving to and from a mobile communications network station;

a Satellite Positioning System (SATPS) receiver for receiving satellite signals from SATPS satellites;

an aiding data function for receiving aiding data from the mobile communications network station;

an assisted acquisition function to use the aiding data and a minimum set of satellite signals to determine an estimated position;

a measurement consistency verifier to analyze a geometric configuration that defines a positional relationship between each of the satellites from which the satellite signals were received and to determine if the satellites are sufficiently close to one another to provide consistent measurements for which ranging difference uncertainties are smaller than a predetermined value.

18. The mobile communications device of claim 17 where the measurement consistency verifier includes software to perform:

a selection of a pair of satellites from a set of satellite identities;

a determination of the following parameters:

R=user position horizontal uncertainty,
$\Delta H$=user position vertical uncertainty,
$\Delta T$=user time uncertainty,
$E_i$, $E_j$=elevation for the selected pair of satellites,
$A_i$, $A_j$=azimuth for the selected pair of satellites,
$\vec{V}_j^{LOS}$, $\vec{V}_i^{LOS}$=satellite velocities along the line-of-sight for the selected pair of satellites, and λ=wavelength=1 if any one of the satellite signals is not bit synchronized, or 20 if both of the satellite signals are bit synchronized;

using the parameters a determination of whether:

$2 \bullet R \bullet \text{SQRT}[\cos^2 E_i + \cos^2 E_j - 2 \bullet \cos E_i \cos E_j \cos(A_i - A_j)] + 2 \bullet \Delta T \bullet |\vec{V}_j^{LOS} - \vec{V}_i^{LOS}| + 2 \bullet \Delta H \bullet |\sin E_i - \sin E_j| < \lambda \bullet 1 \text{ ms};$ a designation of the satellite under test as a consistent satellite if the inequality is met;

a designation of the satellite under test as an inconsistent satellite if the inequality between this satellite and all of the consistent satellites is not met;

a determination of whether a sufficient number of satellites are found to be consistent such that measurements from the consistent satellites can be used to estimate the position.

19. A Satellite Positioning System (SATPS) receiver for receiving satellite signals from SATPS satellites, the SATPS receiver comprising:

a mobile communications network interface for receiving aiding data from a mobile communications network;

an assisted acquisition function to use the aiding data and a minimum set of satellite signals to determine an estimated position; and a measurement consistency verifier to analyze a geometric configuration that defines a positional relationship between each of the satellites from which the satellite signals were received and to determine if the satellites are sufficiently close to one another to provide consistent measurements for which ranging difference uncertainties are smaller than a predetermined value.

20. The SATPS receiver of claim 19 where the measurement consistency verifier includes software to perform:

a selection of a pair of satellites from a set of satellite identities;

a determination of the following parameters:

R=user position horizontal uncertainty,

ΔH=user position vertical uncertainty,

ΔT=user time uncertainty, $E_i$, $E_j$=elevation for the selected pair of satellites, $A_i$, $A_j$=azimuth for the selected pair of satellites, $\vec{V}_j^{LOS}$, $\vec{V}_i^{LOS}$=satellite velocities along the line-of-sight for the selected pair of satellites, and λ=wavelength=1 if any one of the satellite signals is not bit synchronized, or 20 if both of the satellite signals are bit synchronized;

using the parameters a determination of whether:

$2 \bullet R \bullet \text{SQRT}[\cos^2 E_i + \cos^2 E_j - 2 \bullet \cos E_i \cos E_j \cos(A_i - A_j)] + 2 \bullet \Delta T \bullet |\vec{V}_j^{LOS} - \vec{V}_i^{LOS}| + 2 \bullet \Delta H \bullet |\sin E_i - \sin E_j| < \lambda \bullet 1 \text{ ms};$ a designation of the satellite under test as a consistent satellite if the inequality is met;

a designation of the satellite under test as an inconsistent satellite if the inequality between this satellite and all of the consistent satellites is not met;

a determination of whether a sufficient number of satellites are found to be consistent such that measurements from the consistent satellites can be used to estimate the position.

* * * * *

UNITED STATES PATENT AND TRADEMARK OFFICE
CERTIFICATE OF CORRECTION

PATENT NO. : 8,144,053 B2
APPLICATION NO. : 12/025277
DATED : March 27, 2012
INVENTOR(S) : Liao et al.

It is certified that error appears in the above-identified patent and that said Letters Patent is hereby corrected as shown below:

In Column 10, Line 52, in Claim 2, delete "$E_j$," and insert -- $E_j$ --, therefor.

In Column 10, Lines 62-64, in Claim 2, delete "$2 \bullet R \bullet SQRT[\cos^2 E_i + \cos^2 E_j - 2 \bullet \cos E_i \cos E_j \cos(A_i - A_j)] + 2 \bullet \Delta T \bullet |\vec{v}_j^{LOS} - \vec{v}_i^{LOS}| + 2 \bullet \Delta H \bullet |\sin E_i - \sin E_j| < \lambda \bullet 1 \, ms;$" and insert -- $2 \cdot R \cdot \sqrt{\cos^2 E_i + \cos^2 E_j - 2 \cdot \cos E_i \cos E_j \cos(A_i - A_j)} + 2 \cdot \Delta T \cdot |\vec{v}_j^{LOS} - \vec{v}_i^{LOS}| + 2 \cdot \Delta H \cdot |\sin E_i - \sin E_j| < \lambda \cdot 1 ms$ --, therefor.

In Column 11, Lines 65-67, in Claim 9, delete "$2 \bullet R \bullet SQRT[\cos^2 E_i + \cos^2 E_j - 2 \bullet \cos E_i \cos E_j \cos(A_i - A_j)] + 2 \bullet \Delta T \bullet |\vec{v}_j^{LOS} - \vec{v}_i^{LOS}| + 2 \bullet \Delta H \bullet |\sin E_i - \sin E_j| < \lambda \bullet 1 \, ms;$" and insert -- $2 \cdot R \cdot \sqrt{\cos^2 E_i + \cos^2 E_j - 2 \cdot \cos E_i \cos E_j \cos(A_i - A_j)} + 2 \cdot \Delta T \cdot |\vec{v}_j^{LOS} - \vec{v}_i^{LOS}| + 2 \cdot \Delta H \cdot |\sin E_i - \sin E_j| < \lambda \cdot 1 ms$ --, therefor.

In Column 12, Line 64, in Claim 18, delete "$E_j$," and insert -- $E_j$ --, therefor.

Signed and Sealed this
Twenty-second Day of January, 2013

David J. Kappos
*Director of the United States Patent and Trademark Office*

CERTIFICATE OF CORRECTION (continued)
U.S. Pat. No. 8,144,053 B2

In Column 13, Lines 5-7, in Claim 18, delete " $2 \cdot R \cdot SQRT[\cos^2 E_i + \cos^2 E_j - 2 \cdot \cos E_i \cos E_j \cos(A_i - A_j)] + 2 \cdot \Delta T \cdot |\vec{v}_j^{LOS} - \vec{v}_i^{LOS}| + 2 \cdot \Delta H \cdot |\sin E_i - \sin E_j| < \lambda \cdot 1\,ms;$ " and insert -- $2 \cdot R \cdot \sqrt{\cos^2 E_i + \cos^2 E_j - 2 \cdot \cos E_i \cos E_j \cos(A_i - A_j)} + 2 \cdot \Delta T \cdot |\vec{v}_j^{LOS} - \vec{v}_i^{LOS}| + 2 \cdot \Delta H \cdot |\sin E_i - \sin E_j| < \lambda \cdot 1\,ms$ --, therefor.

In Column 14, Line 9, in Claim 20, delete "$E_{j}$," and insert -- $E_j$ --, therefor.

In Column 14, Lines 18-20, in Claim 20, delete " $2 \cdot R \cdot SQRT[\cos^2 E_i + \cos^2 E_j - 2 \cdot \cos E_i \cos E_j \cos(A_i - A_j)] + 2 \cdot \Delta T \cdot |\vec{v}_j^{LOS} - \vec{v}_i^{LOS}| + 2 \cdot \Delta H \cdot |\sin E_i - \sin E_j| < \lambda \cdot 1\,ms;$ " and insert -- $2 \cdot R \cdot \sqrt{\cos^2 E_i + \cos^2 E_j - 2 \cdot \cos E_i \cos E_j \cos(A_i - A_j)} + 2 \cdot \Delta T \cdot |\vec{v}_j^{LOS} - \vec{v}_i^{LOS}| + 2 \cdot \Delta H \cdot |\sin E_i - \sin E_j| < \lambda \cdot 1\,ms$ --, therefor.